(12) United States Patent
Khullar et al.

(10) Patent No.: US 6,907,063 B2
(45) Date of Patent: Jun. 14, 2005

(54) MOBILE STATION, A METHOD OF TRANSMITTING ELECTRONIC INFORMATION, AND A COMMUNICATIONS SYSTEM

(75) Inventors: Anders Khullar, Bjärred (SE); Niklas Stenström, Helsingborg (SE); Bengt Lindoff, Lund (SE); William Camp, Chapel Hill, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 714 days.

(21) Appl. No.: 09/746,450

(22) Filed: Dec. 21, 2000

(65) Prior Publication Data

US 2001/0006899 A1 Jul. 5, 2001

(51) Int. Cl.[7] .............................. H04Q 1/20; G06F 11/00
(52) U.S. Cl. ....................................... 375/224; 714/708
(58) Field of Search ........................ 375/224, 219–259, 375/377; 714/774; 455/574

(56) References Cited

U.S. PATENT DOCUMENTS

| | | | |
|---|---|---|---|
| 4,756,007 A | * 7/1988 | Qureshi et al. | 375/259 |
| 5,375,143 A | * 12/1994 | Kazecki et al. | 375/233 |
| 5,430,743 A | * 7/1995 | Marturano et al. | 714/708 |
| 5,526,399 A | * 6/1996 | Kameda | 455/74.1 |
| 5,638,412 A | 6/1997 | Blakeney, II et al. | 375/358 |
| 5,737,365 A | * 4/1998 | Gilbert et al. | 375/224 |
| 5,805,638 A | 9/1998 | Liew | 375/231 |
| 5,815,507 A | * 9/1998 | Vinggaard et al. | 714/704 |
| 5,818,871 A | 10/1998 | Blakeney, II et al. | 375/220 |
| 5,940,772 A | * 8/1999 | Kameda | 455/557 |
| 5,974,106 A | * 10/1999 | Dupont et al. | 375/377 |
| 6,084,926 A | * 7/2000 | Zak et al. | 375/341 |
| 6,112,325 A | * 8/2000 | Burshtein | 714/774 |
| 6,560,744 B1 | * 5/2003 | Burshtein | 714/774 |
| 6,580,930 B1 | * 6/2003 | Fulghum et al. | 455/574 |

FOREIGN PATENT DOCUMENTS

| | | |
|---|---|---|
| EP | 0154565 A2 | 9/1985 |
| EP | 0512712 A2 | 11/1992 |
| EP | 0739114 A2 | 10/1996 |
| EP | 0836337 A2 | 4/1998 |
| WO | WO 98/09442 | 3/1998 |
| WO | WO 00/24149 | 4/2000 |

OTHER PUBLICATIONS

Hatanaka, K. et al., "A Digital FM Signal Processing System for VCRs," 8087 IEEE Transactions on Consumer Electronics 41, Aug. 1995, No. 3, New York, US, pp. 405–411.

* cited by examiner

Primary Examiner—Stephen Chin
Assistant Examiner—Lawrence B. Williams
(74) Attorney, Agent, or Firm—Jenkens & Gilchrist, P.C.

(57) ABSTRACT

A mobile station adapted to be used in a radio communications system includes a receiver apparatus adapted to receive blocks of distorted information bits at a first rate from a transmitter via a communications link, and a first detecting apparatus adapted to detect information bits from the distorted information bits. The mobile station also includes a second detecting apparatus adapted, when the quality of the received blocks of information bits is above a given level, to detect information bits from the distorted information bits using fewer computation resources than the first detecting apparatus.

14 Claims, 3 Drawing Sheets

Figure 1:
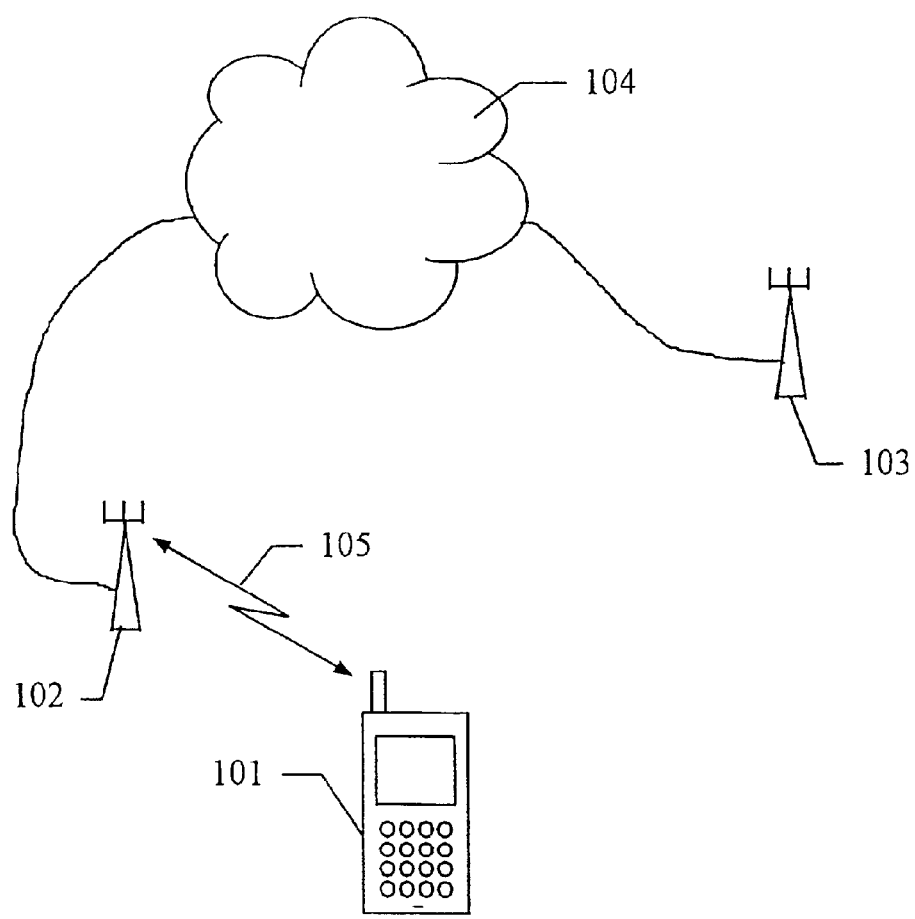

MOBILE STATION, A METHOD OF TRANSMITTING ELECTRONIC INFORMATION, AND A COMMUNICATIONS SYSTEM

The invention relates to a mobile station adapted to be used in a radio communications system, said mobile station including: receiver means adapted to receive blocks of distorted information bits at a first rate, and first detecting means adapted to detect information bits from said distorted information bits.

The invention also relates to a method of transmitting electronic information from a first communications device to a second communications device in a radio communications system, and to a communications system.

Often, when transmitting digital information from a first communications device to a second communication devices, the information is transmitted as blocks of information bits. For example, in Time Division Multiple Access or TDMA systems a number of digital signals are interleaved into a single high-speed channel, i.e. the channel consists of a number of sub-channels providing service to a number of communications devices instead of one. Therefore, when transmitting information to a given communication device, the information is transmitted as blocks of information bits. In TDMA systems the communication is performed during continuously repeating intervals of time or so-called time slots in which two devices are able to interconnect, i.e. blocks of information bits are transmitted therebetween at a given rate.

A mobile station or mobile phone capable of transmitting and/or receiving information such as voice and/or data signals over a cellular communications channel or other air interfaces comprises a radio transceiver. It is well known, when transmitting information from a first communications device, e.g. a base station, to a second communications device, e.g. a mobile station, via a communications link in a radio communications system, the signals transmitted are exposed to distortion, e.g. as a result of intersymbol interference (ISI) introduced by the physical channel. Hence, the signals received by the receiver in the second communications device are distorted versions of the signals originally sent from the first communications device.

Therefore, when blocks of digital information are transmitted from a first communications device to a second communications device via a communications link or channel, blocks of distorted information bits may be received in the second communications device. As a consequence, when receiving blocks of digital information bits, detection of the information bits has to be performed on the basis of the received distorted information in order to recover the information bits originally sent, i.e. information bits are detected from the received distorted information bits.

The object of the present invention is to provide an improved mobile station of the above-mentioned type.

According to the invention, the object is accomplished by a mobile station of the above-mentioned type, said mobile station further including: second detecting means adapted, when the quality of said received blocks of information bits is above a given level, to detect information bits from said distorted information bits using fewer computation resources than said first detecting means, and estimation means adapted to estimate the quality of one or more of said received blocks of information bits and, based thereon, to determine whether to use said first or said second detecting means when detecting information bits.

The invention is based on the circumstance that a number of tasks in a mobile station are implemented in software and are executed by use of the same processor means, i.e. to some extent a number of tasks share the computational resources given in the mobile station. Therefore, computational resourses may advantageously be moved from one process to another when possible. This is of major interest in computational limited communications devices, such as mobile stations, as it enables an optimal use of the given computational resources. According to the invention, the computational recourses freed when using the second detecting means instead of the first detection means can be used for other purposes in the mobile station. Alternatively, the freed computational resources can be saved resulting in a lower power consumption, and as a consequence—when the mobile is powered by battery—will extend the maximum operational time (both talk time and standby time) between recharges of the battery.

In accordance with an expedient embodiment, said mobile station is adapted when operated in a first mode in which said received blocks of information bits are received at said first rate and said first detecting means is used, and when said estimated quality is above a predetermined first threshold, to change to a second mode of operation in which said blocks of information bits are received at said first rate and said second detecting means is used.

Hereby, it is possible to specify a first threshold that the estimated quality must exceed before changing from the first to the second detecting means. For example, this enables specifying the amount of computational resources that, according to the estimation, must be freed before an alternative use of these is of interest, e.g. this may be the case when it is desired to use the computational resources freed only for a given task which requires a given amount of resources.

In accordance with a particularly expedient embodiment, said mobile station is adapted, when operated in said first mode or said second mode and when said estimated quality is above a predetermined second threshold, to change to a third mode of operation in which said blocks of information bits are received at a second rate higher than said first rate and said second detecting means is used. This is of major interest, since the resources freed, as a result of the use of the less complex second detection means when receiving a high quality signal, are used to increase the rate of receiving information in the mobile station, i.e. information throughput is increased.

Preferably, said mobile station is adapted, when operated in said third mode and when said estimated quality is below a predetermined third threshold, to change to said second mode of operation. In this situation channel conditions are found to be below a given level and therefore the transmission rate is decreased. Therefore, the rate at which blocks of information bits are received is decreased, and as a consequence fewer computational resources are needed by said receiver means. In this embodiment of the invention, said second detecting means is used. Therefore, the computational recourses freed—compared to the use of said first detecting means—can be used for other purposes or result in a lower power consumption. It is noted that said third threshold may be equal to said second threshold, if desired.

Preferably, said mobile station is adapted, when operated in said second mode or said third mode and when said estimated quality is below a predetermined fourth threshold, to change to said first mode of operation. Hereby, blocks of information bits having a low quality—according to the performed estimation—can be detected, as computational resources freed from the receiver means enable the use of the more complex and computation requiring first detecting means. Hereby, a degradation in terms of bit errors is avoided.

As mentioned above, the invention also relates to a method as defined in the introductory portion of claim 6. The method according to the invention is characterized by further including: estimating the quality of one or more of said distorted blocks of information bits, and, based thereon, determining whether to perform said first detection or, when the quality of said received blocks of information bits is above a given level, performing a second less computation-demanding detection of information bits from said distorted information bits.

The advantages mentioned in connection with the corresponding mobile station according to the invention are achieved hereby.

Furthermore, the invention relates to a communications system as specified in the introductory portion of claim 10. The system according to the invention is characterized by further including the means specified in the characterizing portion of claim 10. It is noted that the advantages mentioned in connection with the corresponding mobile station according to the invention also apply to such a system.

Expedient embodiments of the method and the system according to the invention are defined in claims 7–9 and claims 11–14, respectively.

It is a major advantage according to at least one embodiment of the invention that the use of fewer computation resources, as a result of using less complex detection apparatus when possible, enables a mobile station to receive information at a higher data rate. Thereby, a higher data throughput can be achieved for the user.

Figure 3A:
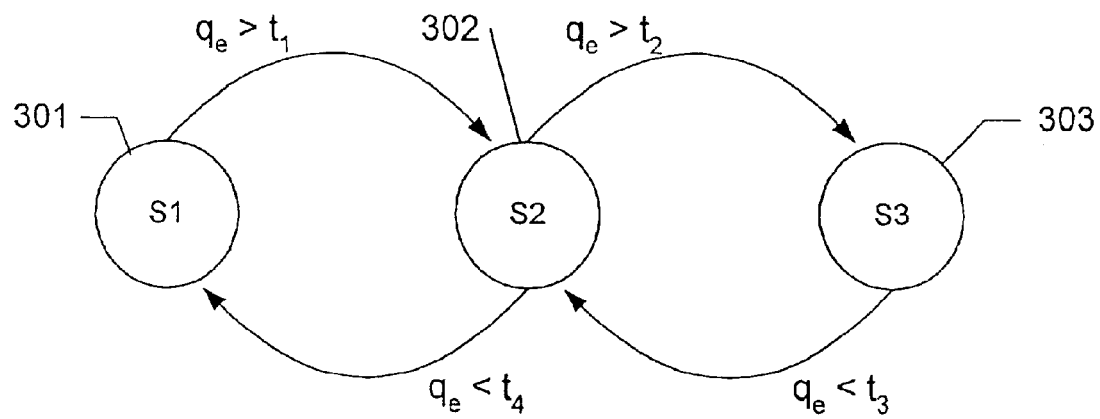
Figure 2A:
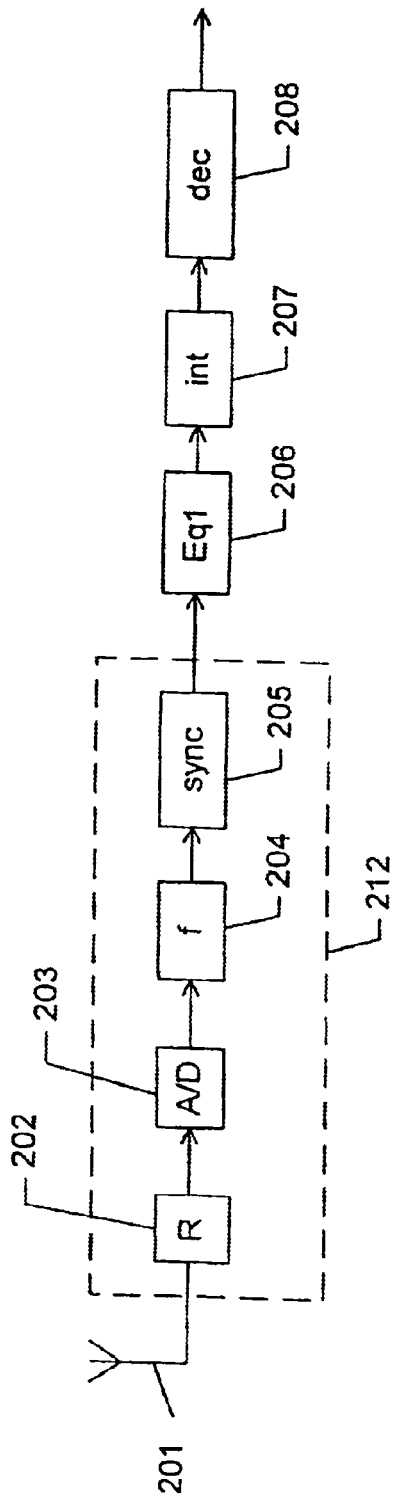
Figure 2B:
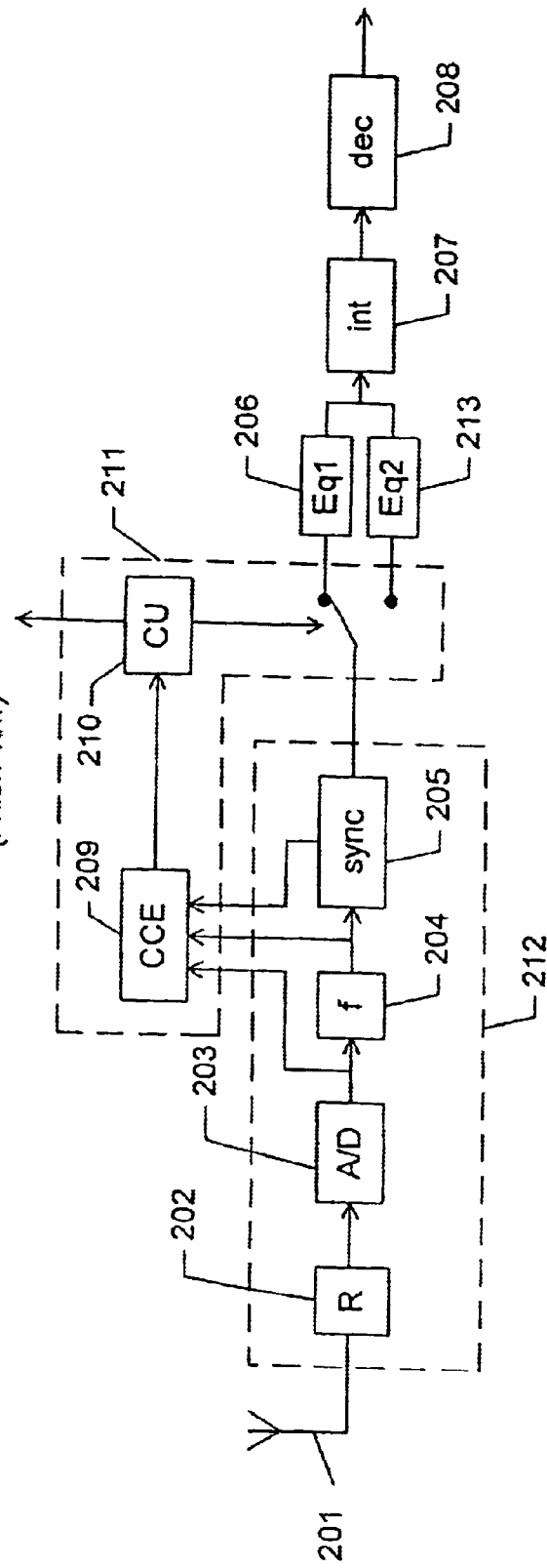
Figure 3B:
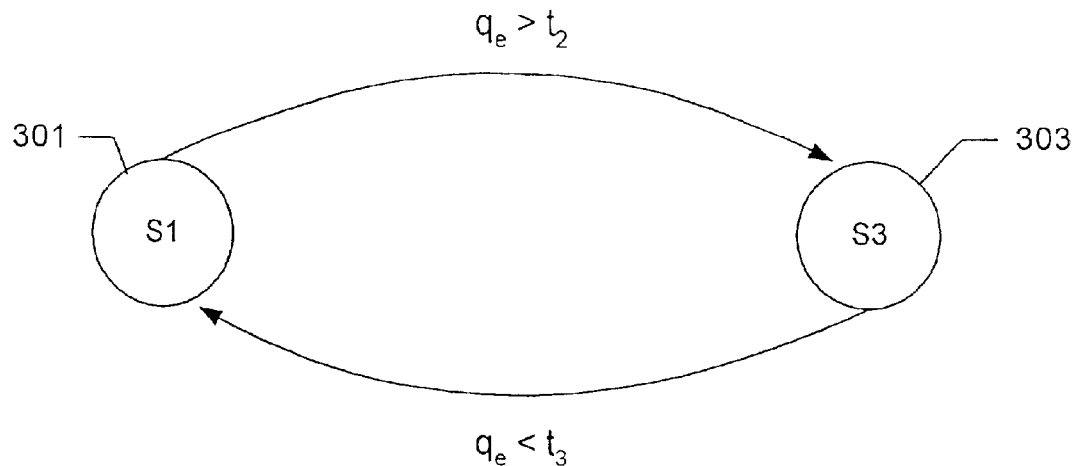
Figure 4:
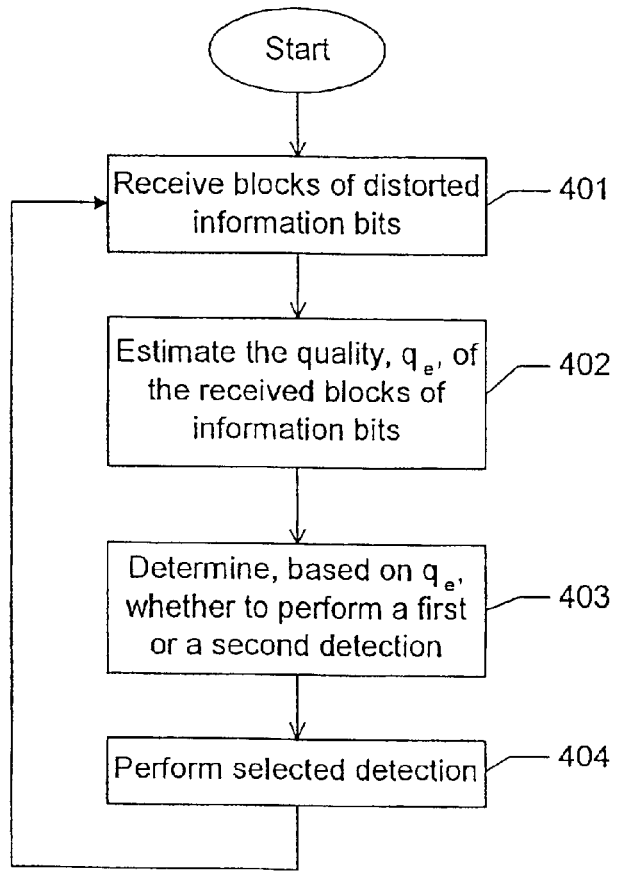

The invention will be explained more fully below in connection with a preferred embodiment and with reference to the drawings, in which:

FIG. 1 illustrates a radio communications system,

FIG. 2A shows a digital receiver in a mobile station according to the prior art, FIG. 2B shows a digital receiver in a mobile station according to the invention, FIG. 3A is a first state diagram illustrating the operation of a receiver according to the invention, FIG. 3B is a second state diagram illustrating the operation of a receiver according to the invention, and FIG. 4 is a flow chart of a method according to the invention.

The figures are schematic and simplified for clarity, and they just show details which are essential to the understanding of the invention, while other details are left out. Throughout, the same reference numerals are used for identical or corresponding parts.

FIG. 1 illustrates a cellular communications system as an example of a radio communications system in which radio telephones or mobile stations contain circuitry to permit transmission and reception of modulated signals, thereby permitting two-way communication between the mobile station 101 and remotely located transceivers known as base stations 102, 103. In such systems, transmission signals are normally produced as a modulation of a carrier signal with the digital symbols to be transmitted via the communications link between a base station 102 and a mobile station 101.

As shown in the figure, in mobile radiophone communications systems, a plurality of base stations 102, 103 are arranged so that each base station covers a respective geographical area called a cell. These cells are grouped together to provide a wide area system coverage. A mobile station 101 located in a given cell communicates with the base station therein via a communications link or communications channel. The base stations 102, 103 are normally formed into a regional or national network of telephone switching offices that links the mobile subscribers to the land based telephone network 104.

Often, when transmitting information from a first communications device to a second communications device, the information is transmitted as blocks of information bits. For example, in Time Division Multiple Access or TDMA systems a number of digital signals are interleaved into a single channel, i.e. the channel consists of a number of sub-channels providing service to a number of communications devices instead of a single one. Therefore, when transmitting information to a given communications device, the information is transmitted in bursts where each burst consists of a number of data symbols or information bits. The communication is performed during continuously repeating intervals of time or time periods—so-called time slots—in which two devices are able to interconnect. Therefore, the blocks of information bits transmitted between a given base station 102 and a given mobile station 101 are transmitted at a given rate.

It is well known that communications links between first and second communications devices in a radio communications system can be of different quality. When the information is transmitted via the communications link, the transmitted signals are exposed to distortion, and as a result the signals received in the second communications device are distorted versions of the signals originally sent. The distortion, which can have a significant influence on the transmission quality and/or reception of voice and data, depends on the quality of the communications link. For example, the quality of the signals received in a mobile station 101 may depend on the distance between the mobile station 101 and the base station 102, on different reflections of the radio waves transmitted between the base station 102 and the mobile station 101, and/or on noise from the area of operation.

When blocks of digital information are transmitted from a first communications device to a second communications device via a communications link, blocks of distorted information bits may be received in the second communications device. Therefore, when receiving bursts or blocks of digital information bits, detection of the information bits has to be performed on the basis of the received distorted information in order to recover the information bits originally sent.

FIG. 2A illustrates a digital receiver in a mobile station according to the prior art. The receiver includes receiver means 212 and first detection means 206. The receiver means 212 is adapted, as a result of a transmission of blocks of information bits from a base station over a communications link, to receive blocks of distorted information bits, whereas the first detection means 206, which is an equalizer in the shown example, is adapted to detect information bits from said distorted information bits.

The receiver means 212 can be implemented in many ways. In the shown example, the receiver means 212 includes a front-end receiver 202, an analogue to digital converter 203, a digital filter 204, and a synchronisation and channel estimation unit 205. The front-end receiver 202 first processes the signal received via the antenna 201 by performing the following steps. Firstly, a band-pass filtering is performed on the received signal in order to filter out the desired frequency band. Secondly, the signal is down-converted to baseband by a mixer. Finally, a low-pass filtering is carried out in order to filter out the mirror signal generated by the mixer.

The output signal from the front-end receiver 202 is A/D converted by the analogue to digital converter 203. The digital filter 204 illustrates that some additional filtering is then carried out to cope with adjacent channel interferers. The sampled signal, i.e. the output signal from the digital filter 204, is fed to the synchronisation and channel estimation unit 205. In some cellular systems, such as the Global System for Mobile Communications or GSM, the information is sent in burst format in which each burst includes a training sequence in the middle of the burst and includes information sequences on each side of the training sequence. The training sequence is used for synchronisation and channel estimation. The synchronisation and channel estimation unit 205 is adapted to perform a synchronisation and channel estimation and, therefore, the output therefrom includes information on the position of the pilot symbols in the burst as well as an estimation of the channel pulse response.

The equalizer 206 that will demodulate the transmitted symbols then uses this information to minimise the effect of intersymbol interference (ISI) introduced by the physical channel. The demodulated symbols together with a probability measure of each symbol (each bit in the symbol) are then fed to the interleaver 207 which splits up consecutive bit errors, as the following channel decoder 208 is not well suited to remedy such errors. The channel decoder 208 then decodes the block of data, which is then passed to higher layers. It is noted that a block of data is associated with a time-slot in a time division multiple access (TDMA) system.

Using multiple time-slots will thus improve the throughput drastically. Using multiple time-slots, however, also has some associated problems since the signal processing of the received symbols requires a powerful digital signal processor (DSP) in terms of instructions per second (IPS). The invention enables the use of several timeslots in an IPS limited system by trading IPS used in one unit (e.g. equaliser) to IPS in a second unit (e.g. channel decoder) if some defined thresholds are fulfilled. Since the number of time-slots granted is decided by the network, this will initiate a renegotiation of service in order to increase the number of time-slots.

The invention uses information on the propagation conditions of the physical channel to decide whether it is possible to disable units or to use a less complex method (in terms of IPS) with only marginal or no loss in receiving performance or not. If this is possible, the total number of IFS spent will decrease and may allow for more time-slots, i.e. increase the transmission rate of the blocks of information bits. That is, the number of time-slots possible to process is dynamically determined by observing the actual channel conditions. The invention includes the possibility of increasing or decreasing the number of time-slots depending on the channel condition by initiating a renegotiation of service.

On the basis of the estimation, i.e. the measurement of the actual receiving condition of the physical channel, a decision of whether it is possible to disable or to use less complex processing units with only negligible performance loss or not is taken. If this is possible and the IPS freed hereby allows the receiver to process more time-slots, a renegotiation of service is called for. The result of the renegotiation of service may or may not be that the mobile station is allowed to use more timeslots.

FIG. 2B is an example of a digital receiver in a mobile station according to the invention. In addition to the elements shown in FIG. 2A, the mobile station according to the invention includes second detecting means 213 adapted, when the quality of said received blocks of information bits is above a given level, to detect information bits from said distorted information bits using less computation resources than said first detecting means 206. Further, as shown in the figure, the mobile station includes estimation means 211 adapted to estimate the quality of received blocks of information bits and, based thereon, to determine whether to use said first detecting means 206 or said second detecting means when detecting information bits. It is noted that the receiver means 212B in this embodiment differs from the receiver means 212 only by being connected to the estimation means 211.

In the shown example, the estimation means 211 includes a channel condition estimator 209 and a control unit 210. The channel condition estimator 209 collects information on the channel quality. This can be carried out in several ways, not limited to the invention. It is noted that estimation of the quality of a communications channel is well known in the field of telecommunication. For example, the quality estimation may be performed as an estimation of the signal/noise ratio of the received signal. The estimated quality is then fed to the control unit 210 that determines whether the channel quality is sufficient or not to disable or change method in a processing unit, e.g. in the equalizer where a change of method could be to change from Maximum Likelihood Sequence Estimation (MLSE) operation to Decision Feedback Equalizer (DFE) operation, thereby using fewer computational resources. If so, and if the number of disablings/changes of method is sufficient to process more time-slots, the control unit disables/changes the unit/units and requests a renegotiation of service. In the shown embodiment, the control unit 210 is adapted to select the method of detection to be used by selecting the first or second eqalizer 206, 213. A second threshold on the estimate of the channel can be used to determine when a simpler equalizer (using fewer IPS) can be used in conjunction with a stronger channel coding, such that the increase in data rate due to the larger number of time slots, offsets the decrease in data rate due to the stronger channel coding.

In the shown embodiment, the channel condition estimator 209 is connected to the output of the analogue to digital converter 203, the digital filter 204, and the synchronisation and channel estimation unit 205. This illustrates that the channel condition estimator 209 may use several signals when estimating the quality of the channel. For example, this is advantageous as the noise contribution related to different types of noise, e.g. adjacent channel noise, cochannel noise and/or thermal noise, can be estimated now.

FIG. 4 is a flow chart illustrating a method of transmitting electronic information according to the invention. The electronic information is transmitted from a first communications device to a second communications device in a radio communications system. In step 401, blocks of information bits, transmitted at a first rate from said first communications device to said second communications device via a communications link, are received as blocks of distorted information bits. In step 402, the quality of received blocks of information bits is estimated in order to estimate the quality of the communications link between the first and second communications devices. In step 403, a determination of whether to perform the first detection, or, when the quality of the received blocks of information bits is above a given level, perform a second less computation-demanding detection of information bits from the received distorted information bits, is carried out. The determination in step 403 is based on the quality estimation performed in step 402. In step 404, the first or second detection selected in step 403 is performed.

Preferably, the estimation and the determination of the steps 402 and 403 are performed on the fly, i.e. at least once for every new block of distorted information bits received, in order to select the optimal detection means to be used. Hereby, as described in relation to FIGS. 3A and 3B, the mobile station can be operated in different states or modes depending on the value of the estimated quality, i.e. when the estimated quality is above or below given predetermined thresholds.

FIG. 3A is a state diagram illustrating the operation of a receiver in a communications device such as a mobile station according to the invention. When receiving electronic information from a base station, the mobile station is operated in one of the three modes or states S1, S2 or S3. In state S1, illustrated by 301 in the figure, blocks of information bits, which are transmitted from a base station at a first rate via a communications link, are received by the mobile station. Due to distortion in the communications link, the transmitted blocks of information bits are received as blocks of distorted information bits. The first detecting means in the mobile station which is adapted to detect information bits from said distorted information bits, is used in the state S1.

The mobile station also includes estimation means adapted to estimate the quality of said communications link or the quality of the received information bits and, based thereon, to determine whether to use said first or said second detecting means when detecting information bits, i.e. whether to continue operating in state S1 or to start operating in state S2. In the shown embodiment, the determination is performed by comparing the estimated quality $q_e$ with a predetermined first threshold $t_1$. When the estimated quality is above the first threshold $t_1$ (i.e. when $q_e > t_1$), the operating state is changed from S1 to S2—otherwise the operating state continues to be S1.

In state S2—like in S1—blocks of information bits are transmitted from a base station to the mobile station at a first rate. But in contrast to state S1, in state S2, the second detecting means, adapted to detect information bits from the received distorted information bits using fewer computation resources than the first detecting means, is used. This operation is possible as a result of the high quality of the communications link and, as a consequence, the high quality of the information bits received. When the estimated quality is above a predetermined second threshold $t_2$ ($q_e > t_2$) the operating state is changed from S2 to S3. If, on the other hand, the estimated quality is below a predetermined fourth threshold $t_4$ ($q_e < t_4$) the operating state is changed from S2 to S1. Otherwise, i.e. if the estimated quality is between the fourth and the second thresholds ($t_4 < q_e < t_2$), the operating state continues to be S2. It is noted that operation in state S2 is advantageous over operation in state S1 due to a lower power consumption as a result of the fewer computation resources required.

In state S3 the second less computation demanding detection means is used—like in S2—but blocks of information bits from the base station are received at a second rate higher than said first rate. For example, in a TDMA system, more time-slots are used when transmitting data from the base station to the mobile station. This operation is possible as a result of the computation resources freed because of using the second detecting means instead of the first detection means due to the high quality of the communications link. When the estimated quality is below a predetermined third threshold $t_3$ ($q_e < t_3$), the operating state is changed from S3 to S2—otherwise the operating state continues to be S3. It is noted that operation in state S3 is advantageous over operation in state S2 when a high data through-put is desirable, e.g. when transmitting non-speech data.

FIG. 3B is a state diagram illustrating the operation of a receiver in a communications device such as a mobile station according to another embodiment of the invention. In this embodiment the mobile station in only operated in the states S1 and S3. This embodiment is expedient when only a high data through-put is desirable. Likewise, an embodiment having only the states S1 and S2 could be used when only a low power consumption is desirable. These situations may be achieved when the above-mentioned first and second, and third and fourth thresholds, respectively, are given the same values.

As the difference in operation of a mobile station between the states S1 and S2 does not affect the operation of the base station, the change of operation between S1 and S2 can be performed without informing the base station. In contrast thereto, the change of operation between the states S2 and S3 or between the states S1 and S3 can only be performed when both the base station and the mobile station so permit. For example, the base station must be able to transmit blocks of information bits at the higher rate. In other words, the base station and the mobile station must agree before the change of operation between the states S2 and S3 takes place. As is well known from the prior art, in order to reach an agreement a so-called negotiation of service may take place. An example is given below.

A mobile station may propose an initial service configuration at the channel connection origination or may propose new service configuration during channel operation. If the mobile station proposes a service configuration which is acceptable to the base station, they both begin using the new service configuration. If the mobile station proposes a service configuration that is not acceptable to the base station, the base station can reject the proposed service configuration or propose an alternative service configuration. The mobile station can reject the service configuration proposed by the base station or propose yet another service configuration to be used. It is noted that the negotiation process described above may include more or less steps, and that it can also be performed with the roles reversed, i.e. the base station initiates the negotiation.

Some preferred embodiments have been shown in the foregoing, but it should be stressed that the invention is not limited to these, but may be embodied in other ways within the subject-matter defined in the following claims. For example, even though the examples given relate to a mobile station receiving information from a base station, the method according to the invention is not limited to be used in a mobile station. In general, the method according to the invention may be used when receiving, in a second communications device, blocks of information bits, transmitted at a first rate from a first communications device to a second communications device via a communications link, as blocks of distorted information bits.

What is claimed is:

1. A mobile station adapted to be used in a radio communications system, said mobile station comprising:

receiver means adapted to receive blocks of distorted information bits at a first rate;

first detecting means adapted to detect information bits from said distorted information bits;

second detecting means adapted, when the quality of said received blocks of information bits is above a given level, to detect information bits from said distorted information bits using fewer computation resources than said first detecting means; and estimation means adapted to estimate the quality of one or more of said received blocks of information bits and, based thereon, to determine whether to use said first or said second detecting means when detecting information bits.

2. A mobile station according to claim 1, wherein said mobile station is adapted, when operated in a first mode in which said received blocks of information bits are received at said first rate and said first detecting means is used, and when said estimated quality is above a predetermined first threshold, to change to a second mode of operation in which said blocks of information bits are received at said first rate and said second detecting means is used.

3. A mobile station according to claim 2, wherein said mobile station is adapted, when operated in said first mode or said second mode and when said estimated quality is above a predetermined second threshold, to change to a third mode of operation in which said blocks of information bits are received at a second rate higher than said first rate and said second detecting means is used.

4. A mobile station according to claim 3, wherein said mobile station is adapted, when operated in said third mode and when said estimated quality is below a predetermined third threshold, to change to said second mode of operation.

5. A mobile station according to claim 3, wherein said mobile station is adapted, when operated in said second mode or said third mode and when said estimated quality is below a predetermined fourth threshold, to change to said first mode of operation.

6. A method of transmitting information from a first communications device to a second communications device in a radio communications system, said method comprising:

receiving, in said second communications device, blocks of information bits, transmitted at a first rate from said first communications device to said second communication device via a communications link, as blocks of distorted information bits;

performing a first detection of information bits from said distorted information bits; and estimating the quality of one or more of said distorted blocks of information bits, and, based thereon, determining whether to perform said first detection or, when the quality of said received blocks of information bits is above a given level, to perform a second less computation-demanding detection of information bits from said distorted information bits.

7. A method according to claim 6, wherein said second detection is performed when said estimated quality is above a predetermined first threshold.

8. A method according to claim 7, wherein when said blocks of information are received at said first rate and when said estimated quality is above a predetermined second threshold, said mobile station requests said base station to transmit said blocks of information at a second rate higher than said first rate.

9. A method according to claim 8, wherein when said blocks of information are received at said second rate, and when said estimated quality is below a predetermined third threshold, said mobile station requests said base station to transmit said blocks of information at a third rate lower than said second rate.

10. A communications system including at least one base station and at least one mobile station, wherein said base station is adapted to transmit blocks of information bits at a first rate to said mobile station via a communications link;

said mobile station comprising receiver means adapted to, as a result of said transmission, receive said transmitted blocks of information bits as blocks of distorted information bits, and includes first detecting means adapted to detect information bits from said distorted information bits;

said mobile station further comprising:

second detecting means adapted, when the quality of said communication link is above a given level, to detect information bits from said distorted information bits using fewer computation resources than said first detecting means; and estimation means adapted to estimate the quality of said communications link and, based thereon, to determine whether to use said first or said second detecting means when detecting information bits.

11. A system according to claim 10, wherein said mobile station is adapted to use said second detecting means when said estimated quality is above a predetermined first threshold.

12. A system according to claim 10, wherein said mobile station is adapted, when said estimated quality is above a predetermined second threshold, to allow said base station to transmit said blocks of information at a second rate higher than said first rate.

13. A system according to claim 10, wherein said mobile station is adapted, when said blocks of information are received at a second rate and when said estimated quality is below a predetermined third threshold, to request said base station to transmit blocks of information at a first rate lower than said second rate.

14. A system according to any one of claims 10–13, wherein said system is a TDMA system, and said blocks of information are transmitted during timeslots.

* * * * *